(12) United States Patent
Tai et al.

(10) Patent No.: US 8,889,280 B2
(45) Date of Patent: Nov. 18, 2014

(54) BATTERY STORAGE MODULE AND MOUNTING SEAT

(75) Inventors: Chang-Lun Tai, New Taipei (TW); Chen-Hsing Cheng, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 313 days.

(21) Appl. No.: 13/304,396

(22) Filed: Nov. 24, 2011

(65) Prior Publication Data

US 2012/0328926 A1   Dec. 27, 2012

(30) Foreign Application Priority Data

Jun. 27, 2011 (TW) .............................. 100122358 A

(51) Int. Cl.
*H01M 2/10* (2006.01)
*B60L 11/18* (2006.01)

(52) U.S. Cl.
CPC .......... *H01M 2/1077* (2013.01); *Y02T 10/7005* (2013.01); *Y02E 60/12* (2013.01); *Y02T 90/14* (2013.01); *B60L 11/1822* (2013.01); *Y02T 90/124* (2013.01); *Y02T 10/7072* (2013.01); *H01M 2220/20* (2013.01); *H01M 2/1083* (2013.01)

USPC ............................................. 429/100; 429/96

(58) Field of Classification Search
USPC ................. 429/100, 96, 97, 98, 163
See application file for complete search history.

(56) References Cited

U.S. PATENT DOCUMENTS

| 6,117,575 A * | 9/2000 | Dinsdale ........................... 429/1 |
| 6,565,381 B1 * | 5/2003 | Chou ............................. 439/501 |
| 2003/0198865 A1 * | 10/2003 | Lai ................................ 429/100 |
| 2004/0224221 A1 * | 11/2004 | Chen et al. ...................... 429/96 |

* cited by examiner

*Primary Examiner* — Mark F Huff
*Assistant Examiner* — Monique Wills
(74) *Attorney, Agent, or Firm* — Novak Druce Connolly Bove + Quigg LLP

(57) ABSTRACT

A battery storage module and a mounting seat for the battery storage module are disclosed. The battery storage module includes a sliding base and a storage battery. The sliding base includes a container, a plurality of wheels, a pair of conducting members and at least one mounting member. The container has a first end and a second end opposite to the first end, the plurality of wheels are mounted on the container, the pair of conducting members are mounted on the first end of the container, and the at least one mounting member is mounted on the second end of the container. The storage battery is received in the container and electrically connected to the pair of conducting members.

5 Claims, 3 Drawing Sheets

BATTERY STORAGE MODULE AND MOUNTING SEAT

BACKGROUND

1. Technical Field

The present disclosure relates to battery modules, and more particularly, to a battery storage module and a mounting seat for the battery storage module.

2. Description of Related Art

In order to transport materials more efficiently and improve the control accuracy of transportations, a transport device, such as an automated guided vehicle (AGV), is commonly employed to carry materials in industrial fields.

A storage battery may be employed to supply power for the AGV. When power of the storage battery is drained, it may need to be disassembled to be recharges and a new storage battery may be replaced by an operator. Such a storage battery may be heavy and difficult to disassemble. Moreover, when carrying or replacing a storage battery, the operator may be injured if the storage battery is accidentally dropped.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
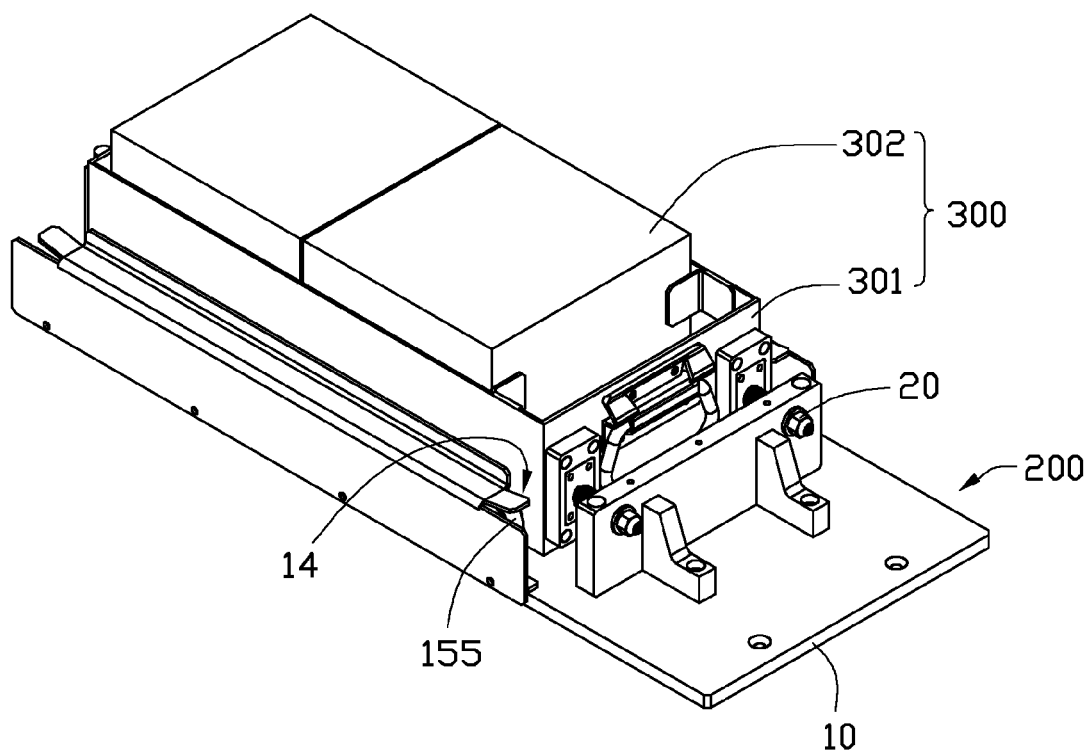
FIG. 1 is an assembled, isometric view of an embodiment of a battery storage module assembled on a mounting seat.

Referring to FIG. 1, it is an assembled, isometric view of an embodiment of a battery storage module 300 and a mounting seat 200 configured to mount the battery storage module 300. The battery storage module 300 is detachably mounted on the mounting seat 200. In the illustrated embodiment, the battery storage module 300 and the mounting seat 200 are mounted on an automated guided vehicle (AGV) for supplying power.

The mounting seat 200 includes a base seat 10, two conducting assemblies 20 mounted on the base seat 10. The base seat 10 can be fixed on the AGV when in use.

Figure 2:
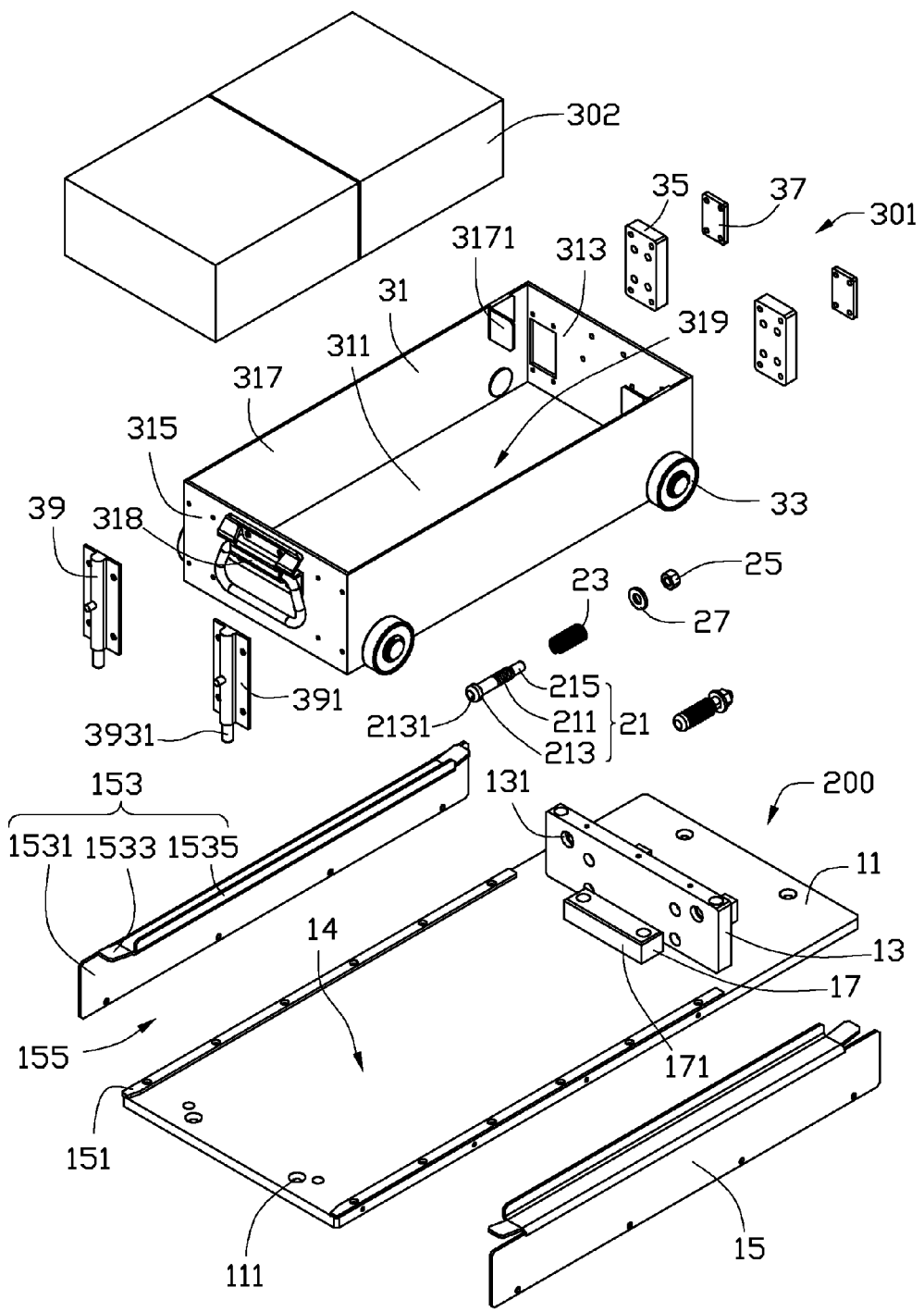
FIG. 2 is an exploded, isometric view of the battery storage module and the mounting seat of FIG. 1.

Referring to FIG. 2, the base seat 10 includes a bottom plate 11, a blocking member 13 mounted the bottom plate 11, a pair of guiding rails 15, and a stopper 17. The pair of guiding rails 15 are fixed on opposite edges of the bottom plate 11. The blocking member 13 and the stopper 17 are disposed adjacent to an end of each of the pair of guiding rails 15.

The bottom plate 11 is substantially rectangular and includes two fixing portions 111 adjacent to a first end of the bottom plate 11. The two fixing portions 111 are positioned at two sides of the opposite edges of the bottom plate 11 and are spaced from each other. A connecting line of centers of the two fixing portions 111 is substantially perpendicular to each of the pair of guiding rails 15. In the embodiment, the two fixing portions 111 are through holes defined on the bottom plate 11.

The blocking member 13 is a rectangular plate and perpendicularly fixed on the bottom plate 11 at a second end opposite to the first end. The blocking member 13 is parallel to the connecting line of the centers of the two fixing portions 111. The blocking member 13 defines two guiding holes 131 adjacent to two ends thereof.

The pair of guiding rails 15 are mounted on opposite edges of the bottom plate 11 and are parallel to each other. The pair of guiding rails 15, the bottom plate 11, and the blocking member 13 cooperatively define an assembly space 14 configured to receive the battery storage module 300. Each of the pair of guiding rails 15 includes a protrusion bar 151 arranged along each of the opposite edges of the bottom plate 11, and a guiding member 153 mounted on a side wall of the bottom plate 11.

The guiding member 153 is a substantially elongated plate and mounted on a side wall of the bottom plate 11 along the length of the protrusion bar 151. The guiding member 153 includes a main body 1531, a bent portion 1533, and an extending portion 1535. The main body 1531 is a substantially rectangular plate perpendicular to the bottom plate 11. The bent portion 1533 is substantially perpendicularly bent from a distal end of the main body 1531 toward a side near a center of the bottom plate 11. The extending portion 1535 extends from a distal end of the bent portion 1533 away from the bottom plate 11 perpendicularly.

The protrusion bar 151 and the guiding member 153 cooperatively define a guiding groove 155 along the length of the bottom plate 11.

The stopper 17 is mounted on the bottom plate 11 adjacent to the blocking member 13. The stopper 17 is an elongated block located at a side of the blocking member 13 adjacent to an end of each of the pairs of guiding rails 15. The stopper 17 is parallel to the blocking member 13 and includes a resisting surface 171 deviating from the blocking member 13.

Each of the two conducting assemblies 20 is respectively mounted in each of the two guiding holes 131 of the blocking member 13. Each of the two conducting assemblies 20 is respectively connected to a positive electrode and a negative electrode of the battery storage module 300. Each of the two conducting assemblies 20 includes a conducting post 21, a resilient member 23 sleeved on the conducting post 21, a restricting member 25, and a washer 27.

The conducting post 21 is substantially cylindrical and slidably mounted in each of the two guiding holes 131 of the blocking member 13. The conducting post 21 includes a restricting portion 211, a conducting end 213, and a connecting end 215. The conducting end 213 and the connecting end 215 are connected to opposite ends of the restricting portion 211.

The restricting portion 211 and the connecting end 215 are located at a first side of the blocking member 13, the conducting end 213 is located at second side of the blocking member 13 towards the two fixing portions 111 of the bottom plate 11. The conducting end 213 is cylindrical and includes a conducting end surface 2131. The connecting end 215 can be electrically connected to the AGV. In the embodiment, the restricting portion 211 is a screw portion.

The resilient member 23 is a spiral spring and has opposite ends contained between the blocking member 13 and the conducting end 213 of the conducting post 21.

The restricting member 25 sleeves on the conducting post 21 and engages with the restricting portion 211 to prevent the conducting post 21 from detaching from each of the two guiding holes 131. In the embodiment, the restricting member 25 is a nut.

The washer 27 movably sleeves on the conducting post 21 and is located between the blocking member 13 and the restricting member 25. The washer 27 is capable of absorbing energy created by collisions on the restricting member 25 and protecting the blocking member 13.

The battery storage module 300 is detachably mounted on the mounting seat 200. The battery storage module 300 includes a sliding base 301, and a storage battery 302 mounted on the sliding base 301. The sliding base 301 includes a container 31, a plurality of wheels 33 mounted on opposite sides of the container 31, two fixing members 35, two conducting members 37 and two mounting members 39. The two fixing members 35 are mounted on a first end of the container 31. Each of the pair of conducting members 37 is respectively fixed to each of the pair of fixing members 35. Each of a pair of mounting members 39 is fixed on a second end of the container 31 opposite to the first end.

The container 31 is a substantially cuboid box with an opening. The container 31 includes a support plate 311, a front wall 313, a back wall 315, a pair of side walls 317, and a pair of knobs 318. Each of the pair of knobs 318 is fixed to the front wall 313 and the back wall 315 respectively.

The front wall 313 extends from a first edge of the support plate 311, the back wall 315 extends from a second edge of the support plate 311 opposite to the first edge. Each of the two side walls 317 is located at each side of the support plate 311 and is parallel to each other. Each of the two side walls 317 connects with the front wall 313 and the back wall 315 by two ends thereof. The front wall 313, the back wall 315 and the two side walls 317 cooperatively define a receiving chamber 319.

Each of the two side walls 317 includes a resisting portion 3171 adjacent to the front wall 313. The resisting portion 3171 is L-shaped and one end of the resisting portion 3171 perpendicularly extends toward another side wall 317. Each resisting portion 3171 is opposite to another resisting portion 3171 and restrains a storage battery 302.

Each of the two knobs 318 is rotatably connected at a substantially middle portion to the front wall 313 and the back wall 315, respectively.

Each of the plurality of wheels 33 is fixed to the pair of side walls 317 for moving the container 31. The plurality of wheels 33 are capable of sliding along the pair of guiding rails 15 in the guiding groove 155 to drive the container 31 toward or away from the blocking member 13.

Figure 3:
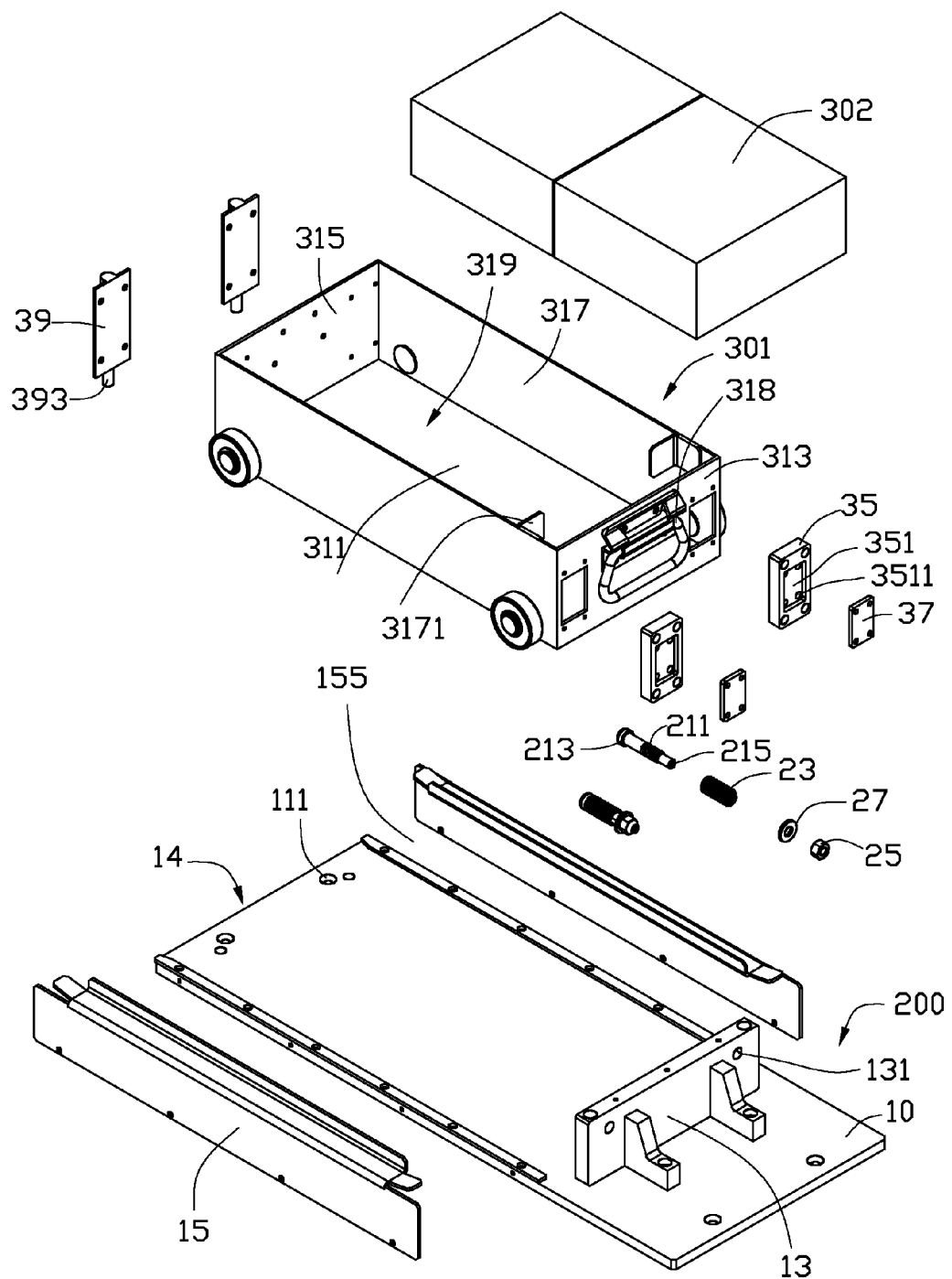
FIG. 3 is similar to FIG. 2, but viewed from another aspect.

Also referring to FIG. 3, each of the pair of fixing members 35 is a block shape and fixed to the front wall 313. Each of the pair of fixing members 35 defines a recess portion 351 on a surface of the fixing member 35 away from the front wall 313. The recess portion 351 is in a cuboids' cavity shape. Each of the pair of fixing members 35 further defines four connecting holes 3511 on a bottom surface of the recess portion 351. In the embodiment, each of the four fixing members 35 is made of plastic materials.

Each of the pair of conducting members 37 is made of metallic materials. Each of the pair of conducting members 37 has a shape corresponding to the recess portion 351 and mounted in the recess portion 351. The conducting end 213 of the conducting post 21 resists on each of the pair of conducting members 37, the four connecting holes 3511 are configured to pass a cable to connect the storage battery 302 to each of the pair of conducting members 37

The pair of mounting members 39 are mounted on the back wall 315 and are spaced from each other. Each of the pair of mounting members 39 includes a main body 391, and inserting rod 393. The main body 391 is a rectangle block fixed on the back wall 315. The inserting rod 393 slides along the length of the main body 391. The inserting rod 393 includes an inserting portion 3931. The inserting portion 3931 is inserted into each of the two fixing portions 111 of the bottom plate 11 to enable the container 31 to be fixed to the base seat 10.

The storage battery 302 is received in the receiving chamber 319 of the container 31. The storage battery 302 is supported by the support plate 311 and retained by each resisting portion 3171. In the embodiment, the storage battery 302 is a plurality of batteries arranged in series.

Referring to FIG. 1 through 3 again, when assembling the mount seat 200, the resilient member 23 is sleeved on the conducting post 21. The connecting post 21 extends into each of the two guiding holes 131 of the blocking member 13. A force is applied to the conducting end 213 of the conducting post 21 and the resilient member 23 is compressed toward the blocking member 13, the washer 27 is sleeved on the conducting post 21, the restricting member 25 engages with the restricting portion 211 to resist the washer 27 toward the blocking member 13. The base seat 10 and the conducting assembly 20 are fixed to the AGV, and the connecting end 215 of the conducting post 21 is electrically connected to the AGV.

When assembling the battery storage module 300, the pair of fixing members 35 are fixed to the front wall 313 and are spaced from each other. Each of the pair of conducting members 37 is fixed on the recess portion 351. The storage battery 302 is mounted in the receiving chamber 319 and resisted by each resisting portion 3171. Each of the pair of conducting members 37 is respectively connected to a positive electrode and a negative electrode of the storage battery 302 via a number of cables extending though the four connecting holes 3511.

When in use, the mounting seat 200 is mounted on the AGV, the battery storage module 300 is mounted on the sliding base 301. The storage battery 302 is moved with the pair of knobs 318 of the sliding base 301 toward the base seat 10. The container 31 is pushed with the front wall 313 facing the blocking member 13. Each of the plurality of wheels 33 rotate in the guiding groove 15 along each of the pair guiding rails 15 until the front wall 313 resists the resisting surface 171, and the battery storage module 30 is located in the assembly space 14. At the same time, the stopper 17 holds the container 31 in position. Each of the pair of conducting members 37 resists the conducting end surface 2131 of the conducting post 21, and the conducting end 213 compresses the resilient member 23 toward the blocking member 13, such that the storage battery 302 is electrically connected to AGV. The inserting portion 3931 of the inserting rod 393 inserts into each of the two fixing portions 111 to fix the pair of mounting members 39 to the bottom plate 11, such that the battery storage module 300 is fixed on the mounting seat 200, the assembly of the battery storage module 300 is accomplished.

When the storage battery 302 is drained, the inserting portion 3931 of each of the pair of mounting members 39 is pulled out, the sliding base 301 is driven by the pair of knobs 318 and drives the storage battery 302 out of the assembly space 14, such that the storage battery 302 is moved into position to be recharged. At the same time, a new battery storage module 300 with a storage battery 302 is assembled into the AGV to enable the AGV keeping on working.

The storage battery 302 is moved out of the AGV to recharge via the mounting seat 200 when the storage battery 302 is drained, and a new battery storage module 300 can be installed in the mounting seat 200 via the pair of mounting members 39 engaging in the two fixing portions 111. Thus, the AGV keeps working even if a storage battery 302 is drained. The resilient member 23 resists the conducting post 21 to ensure the conducting post 21 keeping on contacting with the storage battery 302 electrically, such that the stability of a power supplying for the AGV is improved. The stopper 17 resists the container 31 to prevent the resilient member 23 from being compressed by the battery storage module 300.

The two fixing portions 111 may also be a pair of blind holes. The washer 27 may be omitted when the resisting force of the resilient members 23 is low. The resilient member 23 may be in other structures, such as a resilient post contained between the blocking member 13 and the conducting end 213 of the conducting post 21.

Finally, while various embodiments have been described and illustrated, the disclosure is not to be construed as being restricted thereto. Various modifications can be made to the embodiments by those skilled in the art without departing from the true spirit and scope of the disclosure as defined by the appended claims.

What is claimed is:

1. A battery storage module, comprising:
a sliding base comprising a container having a first end and a second end opposite to the first end, a plurality of wheels mounted on the container, a pair of conducting members mounted on the first end of the container, at least one mounting member mounted on the second end of the container, and two fixing members, each of the two fixing members comprising a recess portion in a cuboids' cavity shape, the recess portion defining four connecting holes, each of the pair of conducting members being mounted in each recess portion; and
a storage battery received in the container and electrically connected to the pair of conducting members,
wherein the four connecting holes are configured to pass a cable to connect the storage battery to the pair of conducting members.

2. The battery storage module of claim 1, wherein the at least one mounting member comprises a main body connected to the container, and an inserting rod slidably mounted on the main body, the inserting rod comprises an inserting portion, the inserting portion is capable of positioning the sliding base.

3. The battery storage module of claim 1, wherein the container comprises a support plate, a front wall, a back wall, and a pair of side walls extend from peripheral edges of the support plate perpendicularly; the support plate, the front wall, the back wall, and the pair of side walls cooperatively define a receiving chamber for receiving the storage battery.

4. The battery storage module of claim 3, wherein the plurality of wheels are mounted on each of the pair of side walls, the pair of conducting members are mounted on the front wall, and the at least a mounting member is mounted on the back wall.

5. The battery storage module of claim 3, wherein each of the pair of side walls comprises a resisting portion adjacent to the front wall, an end of the resisting portion extends towards another of the two side walls perpendicularly, each resisting portion is opposite to another resisting portion, and the resisting portion is capable of resisting and retaining the storage battery.

* * * * *